H. K. PORTER.
Whiffletree-Coupling.

No. 220,494. Patented Oct. 14, 1879.

WITNESSES
Samuel D. Kelley
Eugene Humphrey

INVENTOR.
Henry K. Porter
By Porter & Hutchinson
Attys

UNITED STATES PATENT OFFICE.

HENRY K. PORTER, OF BOSTON, MASSACHUSETTS.

IMPROVEMENT IN WHIFFLETREE-COUPLINGS.

Specification forming part of Letters Patent No. 220,494, dated October 14, 1879; application filed September 12, 1877.

*To all whom it may concern:*

Be it known that I, HENRY K. PORTER, of Boston, State of Massachusetts, have invented an Anti-Rattler for Whiffletrees for Vehicles, of which the following is a specification.

The object of my invention is as follows, to wit, the taking up of the wear of the whiffletree-centers of vehicles, so as to prevent their noise or rattling when in use; and the invention consists in a compound curved spring, which is formed to be attached to the pivot-bolt beneath the cross-bar, and which is either slotted near its ends, to be kept in position by a pin or screw passing through such slots, or is thus kept in place by means of pins upon either side of the spring.

It further consists in a supplemental plate, which is to be attached to the cross-bar, and is provided with the requisite steadying-pins, which hold the spring in position.

It also consists in a washer, which is formed either with pins or stop-flanges, by which it is held in position at the center of the spring, and receives the wear of the nut of the pivot-bolt, all as will, by the aid of the accompanying drawings, be fully described.

Figure 1:
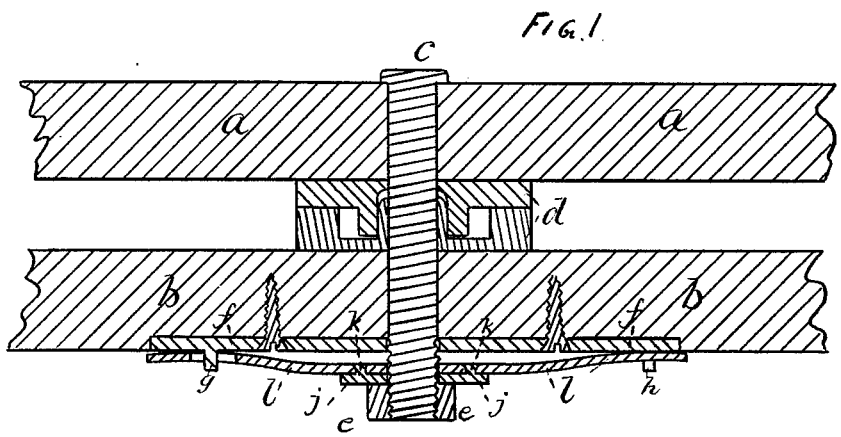
Figure 2:
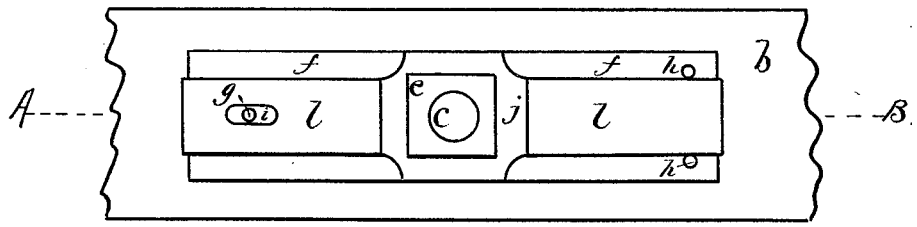
Figures 3, 4, 5, 6:
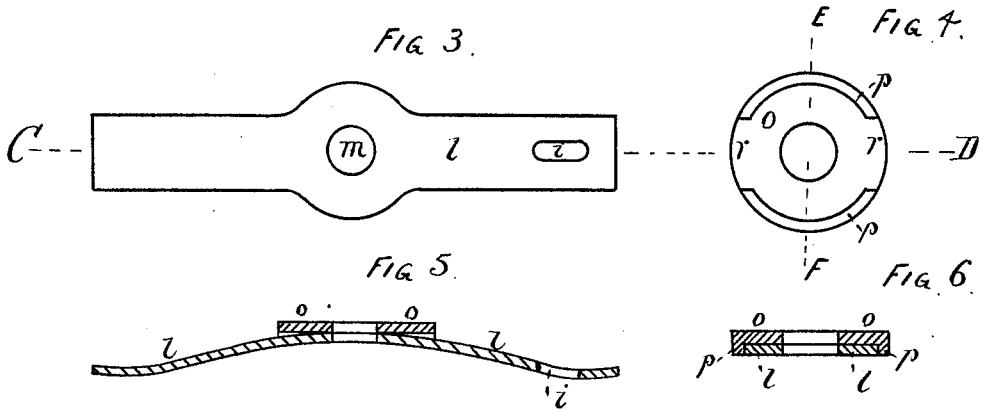

Figure 1 is a longitudinal vertical section taken on line A B, Fig. 2, and showing the cross-bar, the whiffletree, the center, the pivot-bolt, the spring, the supplemental plate, and the washer. Fig. 2 is an under-side view, showing the cross-bar, the supplemental plate, the spring, and its washer. Fig. 3 is a plan view of the spring. Fig. 4 is an under-side plan view of a recessed washer. Fig. 5 is a longitudinal vertical section as taken on line C D, Figs. 3, 4, and showing the spring and washer as united for use. Fig. 6 is a transverse section as taken on line E F, Fig. 4, but also showing the spring united with the washer.

In these figures, $a$ represents the whiffletree. $b$ is the cross-bar. $c$ is the pivot-bolt. $d$ is the center or coupling. $e\ e$ is the nut on bolt $c$. $f\ f$ is the plate, secured to the cross-bar by screws, as shown. $g$ is a pin formed on or secured in plate $f$. $h\ h$ are similar pins, also formed on or secured in plate $f$. $i$ is an elongated hole in spring $l$. $j$ is a washer, having pins $k\ k$ formed as a part thereof. $m$ is the bolt-hole in spring $l$. $o$ is a washer, formed with two flanges projecting from the plane, each representing an arc of the circumference, as shown at $p\ p$ in Figs. 4 and 6, leaving the spaces $r\ r$ between such arcs.

The whiffletree, cross-bar, coupling, and bolt may all be of any desired kind.

The plate $f$ may be formed with a pin, $g$, in the central line, near either end, or with two pins, $h\ h$, near each end, as may be preferred. In the former case both ends of spring $l$ would be formed with a hole like that shown at $i$; but if two pins were formed at each end of plate $f$, then neither end of the spring would be provided with the hole $i$.

When the plate $f$ is not employed, two pins or screws are inserted in holes $i$ and secured in the cross-bar.

The washer $o$ may be of the same form of outline as washer $j$, in which case the center of the spring and the raised flanges $p$ would have a corresponding form.

Spring $l$, when applied in place, may be screwed down close to the cross-bar, and then, as the center or coupling is worn by the motion of the whiffletree, the play or slack thus caused will be taken up by the action of the spring, the constant tendency of which to resume its normal position will prevent any noise or rattling of the several parts.

I claim as my invention—

1. In combination with whiffletree $a$ and cross-bar $b$, a semi-elliptic spring, $l$, substantially as specified.

2. In combination with spring $l$, a washer fitting to the enlarged center thereof, with a pivot-bolt hole coincident with that of the spring, and interlocked or fixedly secured to the spring, so as to be non-rotative thereon, and to receive upon its outer face the wear of the pivot-bolt nut caused by the rotation thereof relatively to such spring as the bolt is actuated by the vibration of the whiffletree, substantially as specified.

HENRY K. PORTER.

Witnesses:
 EUGENE HUMPHREY,
 T. W. PORTER.